(12) United States Patent
Tsurugai et al.

(10) Patent No.: US 11,161,203 B2
(45) Date of Patent: Nov. 2, 2021

(54) PROCESS FOR PRODUCING ALUMINUM MEMBER AND ALUMINUM MEMBER

(71) Applicant: HONDA MOTOR CO., LTD., Tokyo (JP)

(72) Inventors: Etsuko Tsurugai, Wako (JP); Yasuhiko Saijo, Wako (JP); Shoko Namera, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/910,326

(22) Filed: Jun. 24, 2020

(65) Prior Publication Data

US 2020/0406399 A1 Dec. 31, 2020

(30) Foreign Application Priority Data

Jun. 25, 2019 (JP) .............................. JP2019-117044

(51) Int. Cl.

| | |
|---|---|
| *B32B 15/00* | (2006.01) |
| *B23K 26/354* | (2014.01) |
| *B32B 15/01* | (2006.01) |
| *B32B 5/16* | (2006.01) |
| *B32B 7/12* | (2006.01) |
| *B32B 15/08* | (2006.01) |
| *B32B 15/20* | (2006.01) |
| *B23K 26/00* | (2014.01) |
| *B23K 26/12* | (2014.01) |
| *C22C 21/02* | (2006.01) |

(Continued)

(52) U.S. Cl.
CPC ........ *B23K 26/354* (2015.10); *B23K 26/0006* (2013.01); *B23K 26/126* (2013.01); *B32B 5/16* (2013.01); *B32B 7/12* (2013.01); *B32B 15/016* (2013.01); *B32B 15/08* (2013.01); *B32B 15/20* (2013.01); *C22C 21/02* (2013.01); *B23K 2101/35* (2018.08); *B23K 2103/10* (2018.08); *B32B 2255/06* (2013.01); *B32B 2255/205* (2013.01); *Y10T 428/12764* (2015.01)

(58) Field of Classification Search
None
See application file for complete search history.

(56) References Cited

U.S. PATENT DOCUMENTS

| | | | |
|---|---|---|---|
| 7,166,205 B2 * | 1/2007 | Kuo ....................... | C25D 11/12 205/174 |
| 2005/0175836 A1 * | 8/2005 | Kuehnle ................... | C09C 1/00 428/403 |

(Continued)

FOREIGN PATENT DOCUMENTS

| | | | | |
|---|---|---|---|---|
| JP | H11-173356 A | 6/1999 | | |
| WO | WO-0118281 A1 * | 3/2001 | ............. | C25D 11/22 |

*Primary Examiner* — Seth Dumbris
(74) *Attorney, Agent, or Firm* — Rankin, Hill & Clark LLP (57) ABSTRACT

A process for producing an aluminum member, including irradiating a surface of an aluminum raw material member including, as a component, aluminum or aluminum alloy and unavoidable impurities with a top-hat laser beam at an intensity of from 110 MW/cm2 to 320 MW/cm2. The aluminum member includes, in sequence, a base layer containing, as a component, aluminum or aluminum alloy and having unavoidable impurities; an oxide layer containing an aluminum oxide; and a porous layer containing a porous aggregate of aluminum metal particles.

12 Claims, 7 Drawing Sheets

(51) Int. Cl.
*B23K 101/34* (2006.01)
*B23K 103/10* (2006.01)

(56) References Cited

U.S. PATENT DOCUMENTS

| | | | |
|---|---|---|---|
| 2005/0211566 A1* | 9/2005 | Tomita | C25D 11/045 205/324 |
| 2010/0129639 A1* | 5/2010 | Icoz | C23C 24/00 428/317.9 |
| 2014/0076600 A1* | 3/2014 | Browning | C25D 11/02 174/50 |

* cited by examiner

PROCESS FOR PRODUCING ALUMINUM MEMBER AND ALUMINUM MEMBER

CROSS-REFERENCE TO RELATED APPLICATIONS

This application is based upon and claims the benefit of priority from Japanese Patent Application No. 2019-117044, filed on Jun. 25, 2019; the entire contents of which are incorporated herein by reference.

BACKGROUND

The disclosure relates to a process for producing an aluminum member and the aluminum member.

Japanese Patent Application Publication No. H11-173356A (see, in particular, claim 1 and paragraph [0085]) describes an aluminum/fiber-reinforced resin-made shock absorbing member characterized by bonding and joining, by using an adhesive, an aluminum or aluminum alloy-made section and a fiber-reinforced resin including a reinforcing fiber and a resin. In addition, JP-H11-173356A also describes that a bonding surface of aluminum is polished by sandblasting.

SUMMARY

The technology described in JP-H11-173356A fails to disclose the results of investigating environmental durability of a bonding surface between, for instance, an aluminum section and a fiber-reinforced resin. Thus, in the technology described in JP-H11-173356A, there is room for improvement in the durability of bonding surface in response to the environment. Note that as used herein, the durability of bonding surface refers to, for instance, inhibition of occurrence of rust on the bonding surface.

The purpose of the disclosure is to provide a process for producing an aluminum member and the aluminum member allowing for improvement in durability of bonding surface in response to the environment.

The disclosure pertains to a process for producing an aluminum member, comprising irradiating a surface of an aluminum raw material member comprising, as a component, aluminum or aluminum alloy and unavoidable impurities with a top-hat laser beam at an intensity of from 110 MW/cm2 to 320 MW/cm2, wherein the aluminum member comprises: in sequence, a base layer containing, as a component, aluminum or aluminum alloy and having unavoidable impurities; an oxide layer containing an aluminum oxide; and a porous layer containing a porous aggregate of aluminum metal particles. Other solutions will be described later in embodiments of the disclosure.

The disclosure can provide a process for producing an aluminum member and the aluminum member allowing for improvement in durability of bonding surface in response to the environment.

BRIEF DESCRIPTION OF DRAWINGS

The disclosure will become more fully understood from the following detailed description, taken in conjunction with the accompanying figures.

DESCRIPTION OF EMBODIMENTS

Hereinbelow, an embodiment of the disclosure (this embodiment) will be described. In this regard, however, the disclosure is not limited to the following embodiments, and may be optionally modified to the extent to which the effects of the disclosure are not significantly impaired. The disclosure may be implemented while combined with different embodiments. In the different embodiments, the same members have the same reference signs so as to avoid redundancy to simplify the description.

Figure 1A:
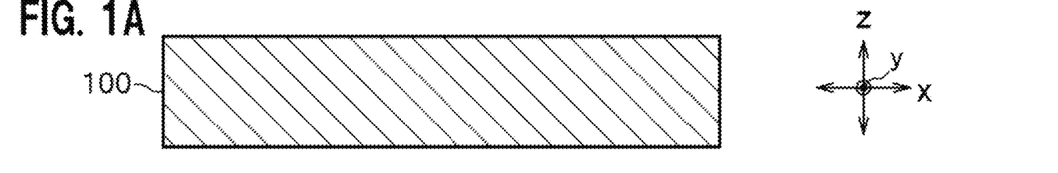
FIG. 1A is a process drawing illustrating a process for producing an aluminum member according to an embodiment of the disclosure such that an aluminum raw material member is arranged in the drawing.

FIG. 1A is a process drawing illustrating a process for producing an aluminum member 10 according to an embodiment of the disclosure (hereinafter, simply referred to as "this production process") such that an aluminum raw material member 100 is arranged in the drawing. The aluminum raw material member 100 is irradiated with a top-hat laser beam (laser beam 102 irradiation shown in FIG. 1B; described below) to produce the aluminum member 10. The aluminum raw material member 100 comprises a flat plate with a thickness of, for instance, from 1 mm to 1 cm.

The aluminum raw material member 100 has, as a component, aluminum or aluminum alloy and unavoidable impurities. In particular, it is preferable that the aluminum raw material member 100 comprises aluminum alloy. When the aluminum raw material member 100 comprises aluminum alloy, the aluminum member 10 can be given a new function caused by impurity elements.

It is preferable that the aluminum raw material member 100 contains aluminum alloy including silicon and copper as impurity elements. Inclusion of silicon enables the melting point of aluminum to decrease and the viscosity during melting to decrease. This makes it easy to form an oxide layer 2 (described later) on a surface of a base layer 1. In addition, inclusion of copper enables the strength of the aluminum member 10 to increase.

Figure 1B:
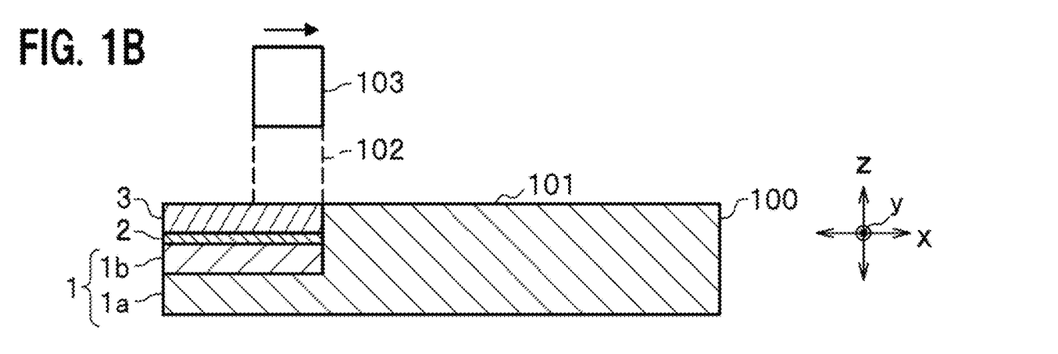
FIG. 1B is a process drawing illustrating this aluminum member production process in which the aluminum raw material member is irradiated with a top-hat laser beam.

FIG. 1B is a process drawing illustrating this aluminum member 10 production process in which the aluminum raw material member 100 is irradiated with a top-hat laser beam 102. Hereinbelow, when the "laser beam 102" is simply referred to, this represents a "top-hat laser beam 102". Laser beam irradiation equipment 103 is used to conduct irradiation with the laser beam 102. The aluminum member 10 is produced, as described above, by irradiating the aluminum raw material member 100 with the laser beam 102. Here, the structure of the aluminum member 10 is illustrated with reference to FIG. 2.

Figure 2:
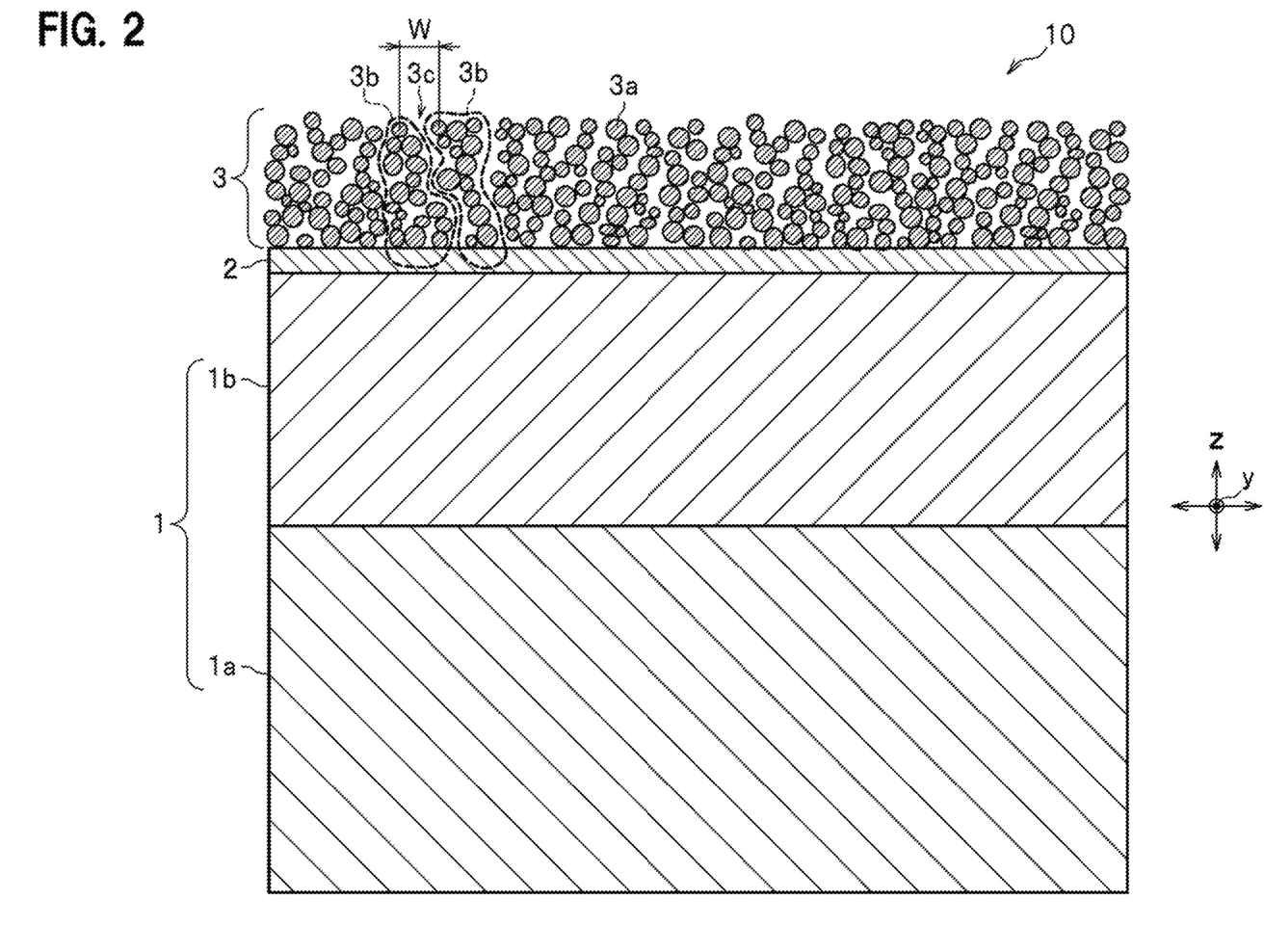
FIG. 2 is a cross-section view of an aluminum member produced by this aluminum member production process.

FIG. 2 is a cross-section view of an aluminum member 10 produced by this aluminum member 10 production process. This aluminum member 10 includes, in sequence, a base layer 1, an oxide layer 2, and a porous layer 3.

The base layer 1 has, as a component, aluminum or aluminum alloy and unavoidable impurities. The base layer 1 is provided with: a main base layer 1a usually having the same composition as of the above aluminum raw material member 100; and a heteroelement layer 1b that is disposed on the porous layer 3 side and contains a higher concentration of impurity elements than that in the main base layer 1a.

The main base layer 1a has usually the same composition as of the aluminum raw material member 100 used in the aluminum member 10 production. In addition, the heteroelement layer 1b has a thickness of, for instance, from 3 μm to 10 μm. By the heteroelement layer 1b being provided, it is possible to contain impurity elements at higher concentrations than those in the main base layer 1a. This can enlarge the effects mediated through a new function exerted by the impurity elements.

The oxide layer 2 is disposed between the base layer 1 and the porous layer 3 and contains an oxide of aluminum (aluminum oxide). Inclusion of the aluminum oxide makes it possible to inhibit corrosion of the oxide layer 2 due to moisture content when an adhesive layer 4 (described later) disposed, for instance, on the porous layer 3 side absorbs moisture. This can inhibit the base layer 1 corrosion originated at the oxide layer 2 and thus makes it possible to increase corrosion resistance of the aluminum member 10.

The oxide layer 2 has a thickness of, for instance, from 20 nm to 150 nm. When the thickness of the oxide layer 2 is within this range, the thickness of the oxide layer 2 can be made thicker than the usual thickness (several nm) of a passive state. Then, because the oxide layer 2 is positioned below the porous layer 3, oxygen is not easily delivered to the oxide layer 2. Due to this, even in the case of occurrence of, for instance, a crack in the oxide layer 2, the thickness of, for instance, from 20 nm to 30 nm should be sufficient to suppress exposure of the base layer 1 arranged below the oxide layer 2. This can inhibit rust originated at the exposure site on the base layer 1.

The porous layer 3 is made porous by aggregation of aluminum metal particles 3a. The porous layer 3 has a thickness of, for instance, from 30 nm to 500 nm. When the thickness of the porous layer 3 is within this range, it is possible to extend the contact area between the porous layer 3 and an adhesive applied.

The porous layer 3 contains metal particles 3a with a diameter of from 6 nm to 20 nm and preferably from 6 nm to 10 nm. When the diameter of the metal particles 3a is within these ranges, it is possible to increase the degree of tight attachment between the metal particles 3a and the adhesive layer 4 (described later) formed by adhesive application (described later). This can suppress formation of a gap on the bonding surface between the adhesive layer 4 and the metal particles 3a, thereby capable of inhibiting the porous layer 3 surface corrosion originated at the gap. This may result in an increase in durability in response to the environment.

Note that the metal particles 3a are usually coated by passivation. Accordingly, the total diameter of the metal particles 3a and those included in a passive state preferably meets the above numerical ranges. The diameter of the metal particles 3a may be measured by inspecting a cross section by using, for instance, an electron microscope, and the longest diameter of the metal particles 3a preferably meets the above ranges.

In the porous layer 3, the metal particles 3a are deposited in a height direction. The deposition of the metal particles 3a can be examined by inspecting a cross section by using, for instance, an electron microscope. The deposition of the metal particles 3a in the height direction allows for an increase in the surface area of the porous layer 3. The increase in the surface area can increase the area of contact between the porous layer 3 and the adhesive, thereby capable of increasing the number of inter-surface bonds between the adhesive layer 4 and the porous layer 3. This can enhance the bonding strength.

The porous layer 3 has a pit-like structure in which pits 3c are formed, in the height direction, between adjacent deposits 3b and 3b among the deposits 3b of the metal particles 3a. This pit-like structure can be verified by inspecting a cross section by using, for instance, an electron microscope. After the pits 3c are formed between the adjacent deposits 3b and 3b, the adhesive can easily infiltrate the pits 3c by applying the adhesive onto the porous layer 3. This can solidify the adhesive along roughness of the surfaces of the deposits 3b, thereby capable of using an anchoring effect to enhance the strength of bonding to the adhesive layer 4.

The interval W between the adjacent deposits 3b and 3b is, for instance, from 1 nm to 50 nm. This interval W may be checked by inspecting a cross section by using, for instance, an electron microscope. This interval W can be defined as the distance between the centers of the metal particles 3a most distally positioned (on the adhesive layer 4 side) among the adjacent deposits 3b and 3b. When the interval W is within the above range, it is possible to retain the amount of the adhesive impregnated into the pits 3c, thereby capable of increasing the strength of bonding to the adhesive layer 4.

Now, back to FIG. 1B. The aluminum raw material member 100 is heated by irradiating the aluminum raw material member 100 with the laser beam 102. The heating of the aluminum raw material member 100 causes gasification (volatilization) of aluminum on a surface of the aluminum raw material member 100. The gasified aluminum becomes aggregated at or near the surface to produce nanoparticles, which are then deposited on a surface of the aluminum raw material member 100. This causes formation of the porous layer 3 containing the aluminum metal particles 3a.

In addition, the oxide layer 2 is formed by instantaneous melting and oxidation of the aluminum raw material member 100 that has not been sufficiently heated for gasification. The oxide layer 2 contains oxides of impurity elements (e.g., copper oxide). The oxidation of impurity elements can inhibit corrosion that may occur during use of the aluminum member 10 and is originated at the impurity elements, thereby capable of increasing corrosion resistance. Further, impurity elements (e.g., silicon) that have not been melted have a higher concentration, due to instantaneous thermal diffusion, than that in the aluminum raw material member 100 to form the heteroelement layer 1b.

The energy density is uniform over the entire surface that is on the aluminum raw material member 100 and irradiated with the laser beam 102. This can cause the gasification, aggregation, and deposition of aluminum without unevenness over the entire laser beam irradiation surface when irradiated once with the laser beam 102. This results in avoiding repeated gasification, aggregation, and deposition, and the layer structure shown in FIG. 2 can be obtained.

A surface 101 of the aluminum raw material member 100 is irradiated with the laser beam 102 at an intensity of from 110 MW/cm2 to 320 MW/cm2. When the intensity of the laser beam 102 is within this range, aluminum in the aluminum raw material member 100 can be gasified while the melting point varies depending on the composition of the aluminum raw material member 100. In addition, the lower the intensity of the laser beam 102 emitted, the easier the aggregation after gasification and the larger the metal particles 3a. Meanwhile, the higher the intensity of the laser beam 102 emitted, the more difficult the aggregation after gasification and the smaller the metal particles 3a. Then, the intensity of 110 MW/cm2 or higher can cause the diameter of the metal particles 3a to be 20 nm or less. In addition, the heat conduction allows for formation of the oxide layer 2 below the porous layer 3. Further, the intensity of 320 MW/cm2 or lower makes it possible to suppress the miniaturization of the metal particles 3a due to excessive heating, so that the diameter of the metal particles 3a can be 6 nm or more.

It is preferable that the intensity of the laser beam 102 is 220 MW/cm2 or higher. The intensity of 220 MW/cm2 or higher allows impurity elements to be made sufficiently harmless because of oxidation of impurity elements (containing unavoidable impurities) included in the aluminum raw material member 100. In a case where the aluminum raw material member 100 comprises aluminum alloy, in particular, impurity elements included in the aluminum alloy can be made sufficiently harmless. Consequently, corrosion caused by the impurity elements can be sufficiently inhibited.

As long as the irradiation has an intensity of from 110 MW/cm2 to 320 MW/cm2, the wavelength of the laser beam 102 emitted is not particularly limited. The wavelength of the laser beam 102 may be, for instance, 1064 nm or 532 nm.

It is preferable that the irradiation with the laser beam 102 is carried out under an oxidizing atmosphere. The irradiation with the laser beam 102 under an oxidizing atmosphere can make it easy to form the oxide layer 2. The irradiation under an oxidizing atmosphere includes, for instance, irradiation in the air. Provided that even irradiation with the laser beam 102 under a reducing atmosphere or an inert atmosphere can cause formation of the oxide layer 2 by switching to an oxidizing atmosphere after the irradiation.

It is preferable that the irradiation with the laser beam 102 is carried out under an atmosphere at from 45% RH to 90% RH. The irradiation with the laser beam 102 under an atmosphere at 45% RH or higher enables water molecules to be attached to the metal particles 3a. This can promote infiltration of an adhesive into the porous layer 3, which has aggregates of the metal particles 3a. Meanwhile, the irradiation with the laser beam 102 under an atmosphere at 90% RH or lower can prevent water molecules from being excessively attached to the metal particles 3a, thereby capable of maintaining the physical properties of the adhesive infiltrating the porous layer 3.

Figure 1C:
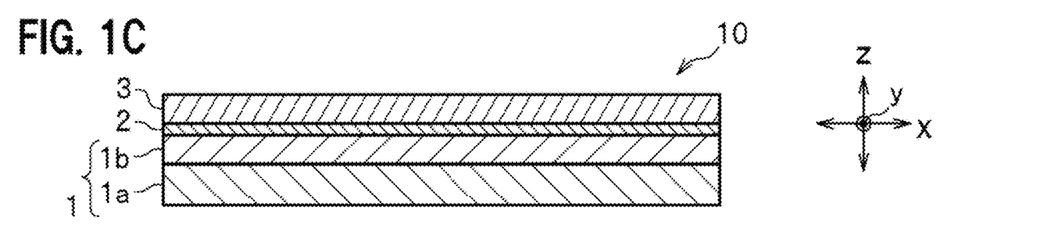
FIG. 1C is a process drawing illustrating this aluminum member production process in which an aluminum member according to this embodiment has been produced by irradiation with the top-hat laser beam.

FIG. 1C is a process drawing illustrating this aluminum member 10 production process in which the aluminum member 10 according to this embodiment has been produced by irradiation with the laser beam 102. The aluminum raw material member 100 is irradiated with the laser beam 102 under the above conditions to produce the aluminum member 10 shown in FIG. 1C. Note that in FIG. 1C, the structure of the porous layer 3 is simplified and depicted for illustration simplification.

Figure 1D:
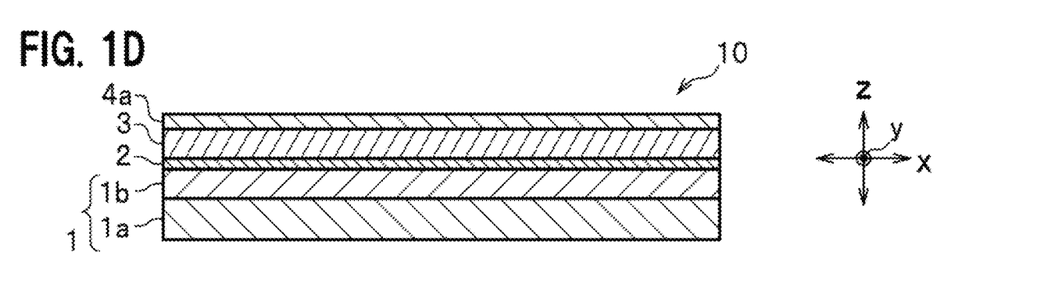
FIG. 1D is a process drawing illustrating this aluminum member production process in which how an adhesive is applied onto a surface of a porous layer is indicated.

FIG. 1D is a process drawing illustrating this aluminum member 10 production process in which how an adhesive 4a is applied onto a surface of the porous layer 3 is indicated. The adhesive 4a is solidified to form the below-described adhesive layer 4. Examples of the adhesive 4a include an epoxy adhesive. The adhesive 4a applied on the porous layer 3 infiltrates pits 3c (see FIG. 2) in the porous layer 3. The infiltrating adhesive 4a is solidified along roughness on the surfaces of deposits 3b, and the adhesive layer 4 (see FIG. 1E) is then formed along the roughness on the surfaces of deposits 3b.

Figure 1E:
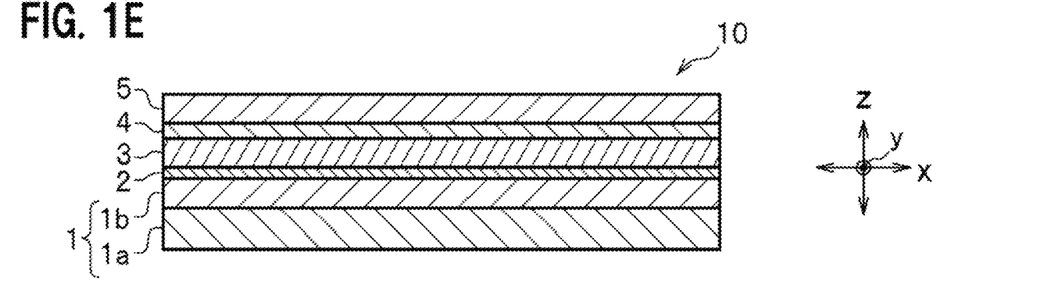
FIG. 1E is a process drawing illustrating this aluminum member production process in which a member to be bonded is bonded via an adhesive layer to the porous layer to prepare an aluminum member.

FIG. 1E is a process drawing illustrating this aluminum member 10 production process in which a member 5 to be bonded is bonded via the adhesive layer 4 to the porous layer 3 to prepare the aluminum member 10. By bonding the member 5 to the porous layer 3, it is possible to increase environmental durability on the surface of bonding the porous layer 3 and the member 5. The member 5 to be bonded is placed on the adhesive 4a prior to the solidification after the adhesive 4a is applied as shown in FIG. 1D, and the adhesive 4a is then solidified. In this way, the member 5 to be bonded may be bonded via the adhesive layer 4 to the porous layer 3.

Examples of the member 5 to be bonded comprises a carbon fiber-reinforced composite member or a second aluminum member. Inclusion of a carbon fiber-reinforced composite member makes it possible to produce a metal-resin composite member having excellent environmental durability. The carbon fiber-reinforced composite member comprises, for instance, a carbon fiber-reinforced composite resin material (CFRP). In addition, inclusion of a second aluminum member makes it possible to produce an aluminum composite member having excellent environmental durability. The second aluminum member may be an aluminum member (pure aluminum or aluminum alloy) having the same components as of the aluminum member 10. The aluminum member may have components different from those of the aluminum member 10.

The surface that is of the member 5 to be bonded and is to be bonded to the adhesive 4a may be subjected to any surface treatment. Examples of the surface treatment include: treatment so as to increase the strength of bonding to the adhesive 4a; or treatment so as to facilitate tight attachment.

According to this production process and aluminum member 10, it is possible to provide a process for producing an aluminum member 10 and the aluminum member 10 such that environmental durability can be improved on a bonding surface between the adhesive layer 4 and the porous layer 3.

EXAMPLES

Hereinafter, Examples are used to further specifically describe the disclosure.

Example 1

As an aluminum raw material member 100, an aluminum alloy-made plate material was provided which contained impurity elements (including unavoidable impurities) at the ratio below:

magnesium in an amount of from 0.2 mass % to 0.3 mass %;

silicon in an amount of from 7.5 mass % to 8.5 mass %;

copper in an amount of from more than 0 mass % to 0.2 mass %;

zinc in an amount of from more than 0 mass % to 0.05 mass %;

iron in an amount of from more than 0 mass % to 0.2 mass %;

manganese in an amount of 0.6 mass %; and unavoidable impurities.

A Q switch Nd-YAG laser system was used for irradiation equipment that emitted a laser beam 102 to the aluminum raw material member 100. This irradiation equipment can emit a top-hat laser beam 102. The wavelength of the laser beam 102 emitted was 1064 nm. This irradiation equipment was used to irradiate a surface of the aluminum raw material member 100 with the laser beam 102 at a laser output of 320 MW/cm2. The light irradiation with the laser beam 102 was carried out in the air (oxidizing atmosphere) at 50% RH.

A cross section of the aluminum member 10 obtained by the irradiation with the laser beam 102 was photographed. The cross section was photographed using a scanning electron microscope.

Figure 3A:
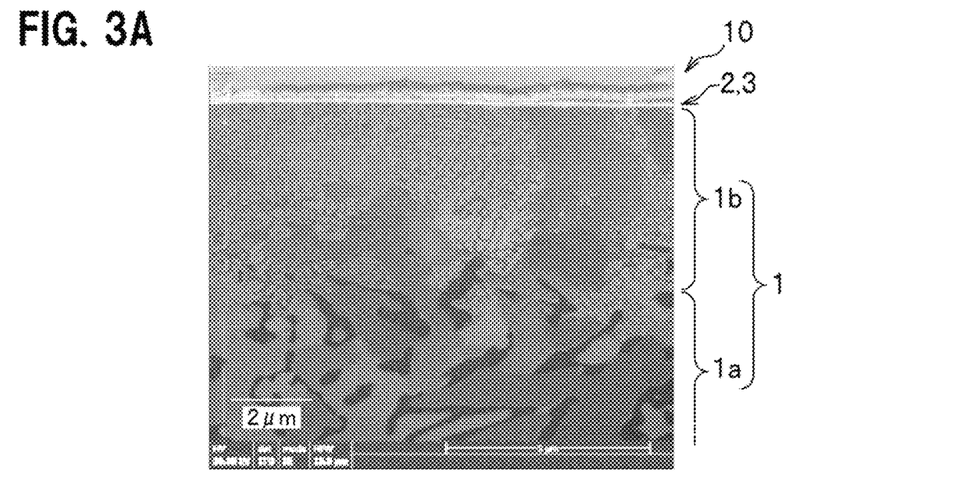
FIG. 3A is an electron micrograph of a cross section of an aluminum member produced in Example 1.

FIG. 3A is an electron micrograph of a cross section of the aluminum member 10 produced in Example 1. As shown in FIG. 3A, the organization form of the base layer 1 on the porous layer 3 side was different from that on the opposite side. This seems to be due to the laser beam irradiation-mediated instantaneous gasification of impurity elements in the aluminum raw material member 100. Because this caused the impurity elements to move to an upper side (on a top surface side, namely on the porous layer 3 side), the heteroelement layer 1b with a thickness of about 5 μm seems to be formed on the porous layer 3 side. Also, the main base layer 1a is present below the heteroelement layer 1b.

Figure 3B:
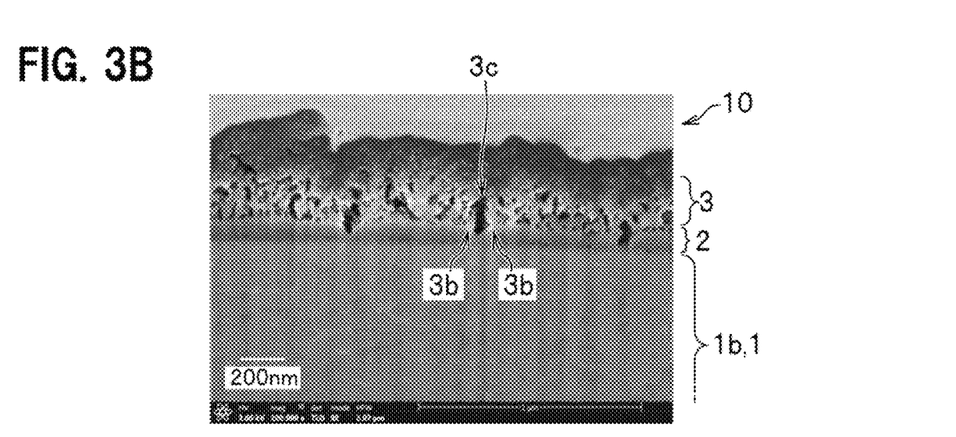
FIG. 3B is an electron micrograph of a cross section of the aluminum member produced in Example 1 and a site at or near an oxide layer and a porous layer is magnified and photographed.

FIG. 3B is an electron micrograph of a cross section of the aluminum member 10 produced in Example 1 and a site at or near the oxide layer 2 and the porous layer 3 is magnified and photographed. A protective film for observation when used at the time of photographing a cross section was observed above the porous layer 3 and was not a component layer of the aluminum member 10. As shown in FIG. 3B, the oxide layer 2 with a thickness of 100 nm was formed on an upper side of the base layer 1. In addition, the porous layer 3 with a thickness of 300 nm was formed on an outer side of the oxide layer 2. In the porous layer 3, deposits 3b were observed, caused by deposition of metal particles 3a in a height direction. Note that pits 3c were observed between the adjacent deposits 3b and 3b. Thus, it was verified that the porous layer 3 had a pit-like structure.

Figure 3C:
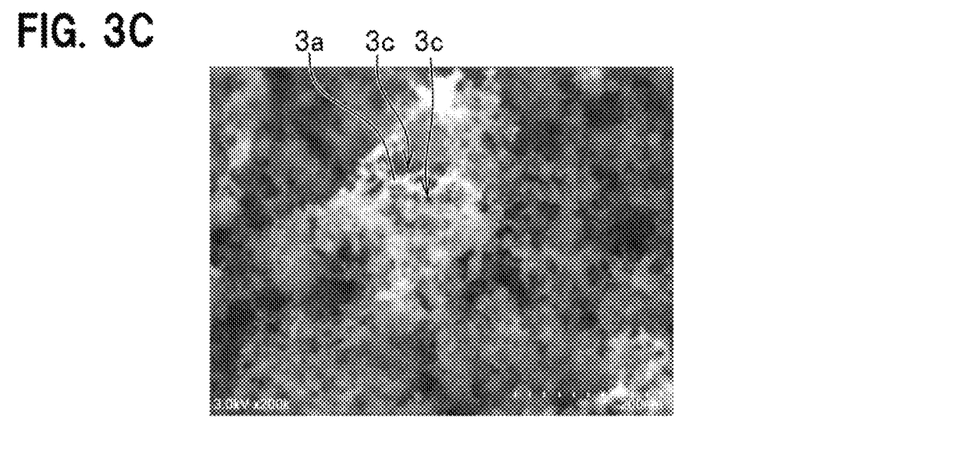
FIG. 3C is an electron micrograph of the aluminum member produced in Example 1 and a surface of the porous layer is photographed.

FIG. 3C is an electron micrograph of the aluminum member 10 produced in Example 1 and a surface of the porous layer 3 is photographed. FIG. 3C also demonstrated that the porous layer 3 had deposits 3b caused by deposition of the metal particles 3a. The diameter of the metal particles 3a was approximately 6 nm. In addition, the interval W between the adjacent deposits 3b and 3b that were deposits 3b of the metal particles 3a was from about 10 nm to 20 nm.

Example 2

How a change in the intensity of the laser beam 102 affected the diameter of the metal particles 3a was investigated. Specifically, an aluminum member 10 was produced in the same manner as in Example 1, except that the intensity of the laser beam 102 (hereinafter, referred to as the laser beam intensity) was set to either 110 MW/cm2, 220 MW/cm2, 260 MW/cm2, or 320 MW/cm2. A cross section of the porous layer 3 in the aluminum member 10 produced was photographed using an electron microscope, and the diameter of the metal particles 3a was then measured.

Figure 4:
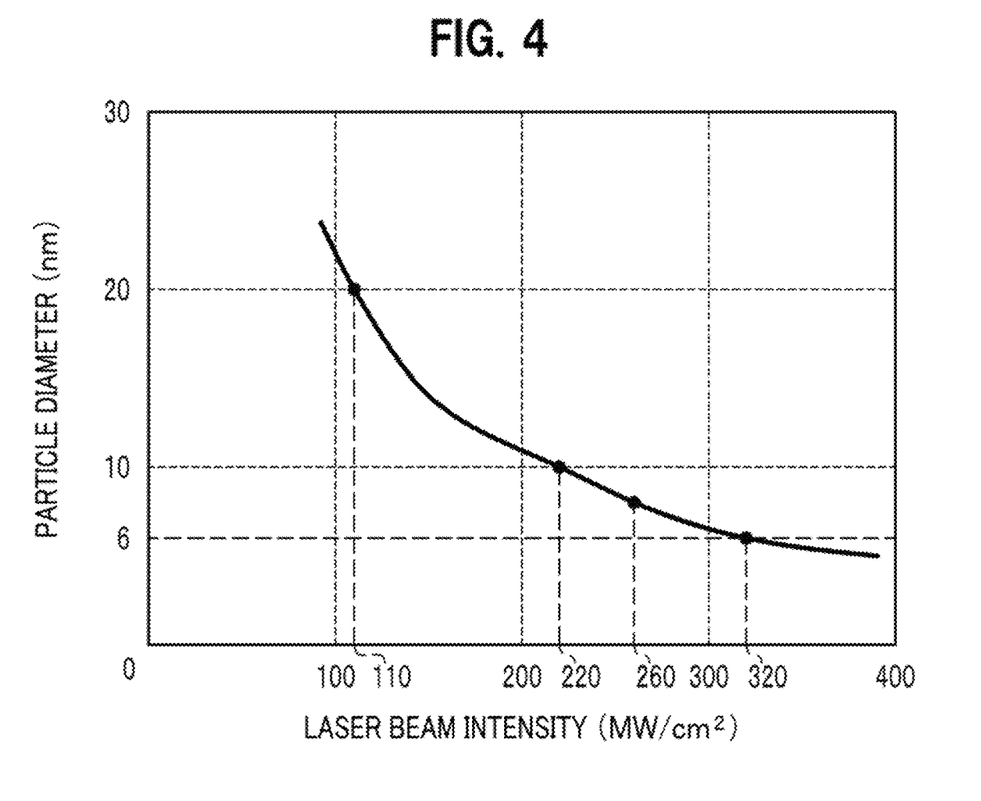
FIG. 4 is a graph showing the particle diameter of metal particles with respect to the laser beam intensity in Example 2.

FIG. 4 is a graph showing the particle diameter of metal particles 30a with respect to the laser beam intensity in Example 2. As the laser beam intensity increased, the particle diameter became smaller exponentially. Specifically, when the laser beam intensity was 110 MW/cm2, the particle diameter was 20 nm. In addition, when the laser beam intensity was 220 MW/cm2, the particle diameter was 10 nm; when the laser beam intensity was 260 MW/cm2, the particle diameter was 8 nm; and when the laser beam intensity was 320 MW/cm2, the particle diameter was 6 nm. Note that although not depicted, the base layer 1, the oxide layer 2, and the porous layer 3 were formed in this order in any of the cases.

In the cases where the laser beam 102 was emitted at each laser beam intensity, the particle diameter was almost in agreement with the graph of the exponential function after a measurement error was considered. Hence, the laser beam intensity was found to be correlated with the particle diameter. This has demonstrated that the laser beam intensity can be determined depending on the desired particle diameter after the above correlation has been determined, for instance, experimentally.

Example 3

The current density of current flowing through an aluminum member 10 was measured. In this way, a corrosion resistance test was conducted to evaluate corrosion resistance of the aluminum member 10.

Figure 5:
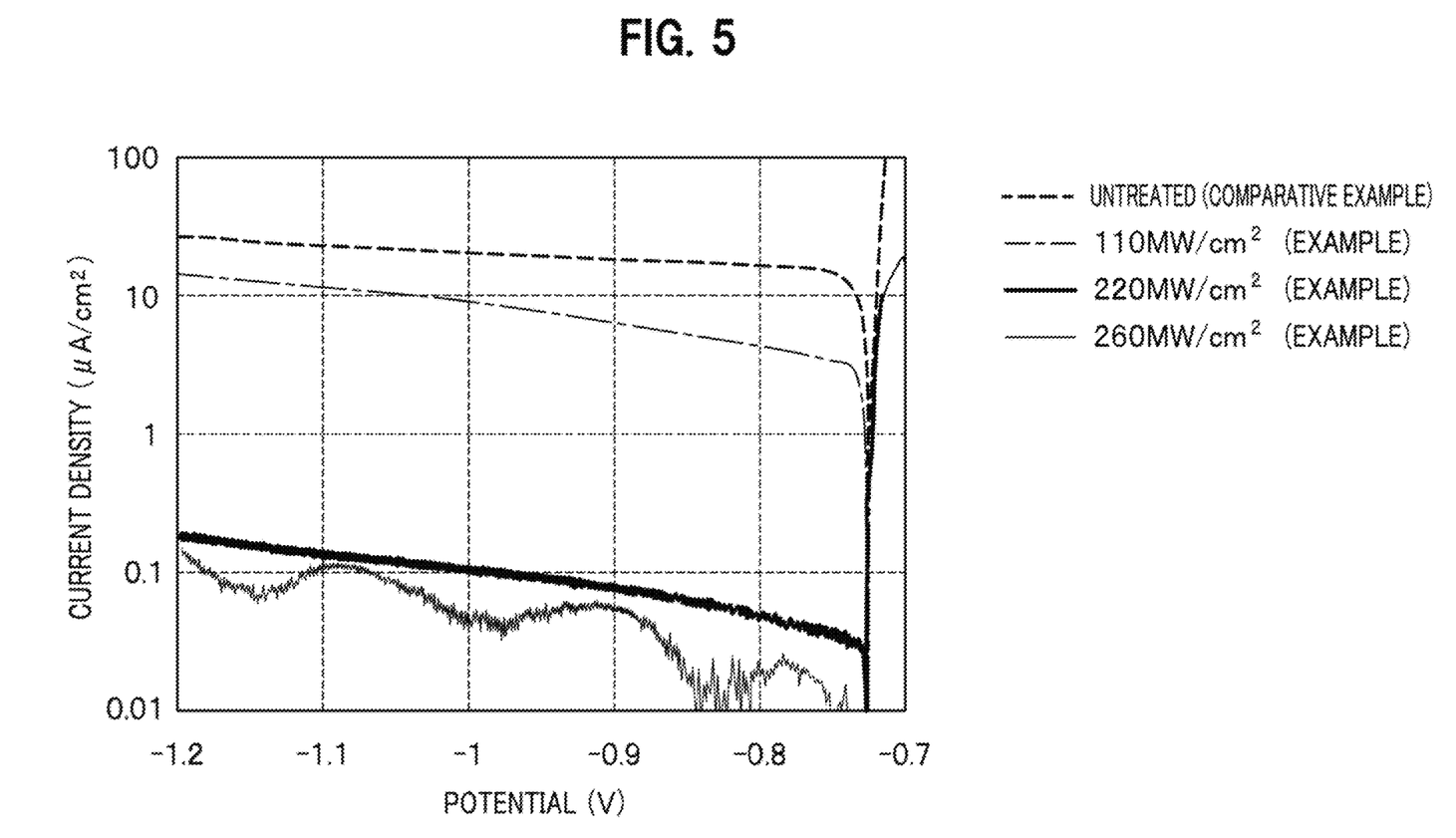
FIG. 5 is a graph showing the results of a corrosion resistance test in Example 3.

The aluminum member 10 was produced in the same manner as in Example 1, except that the laser beam intensity was set to either 110 MW/cm2, 220 MW/cm2, or 260 MW/cm2. For the five different aluminum members 10 produced, the current density of current flowing was measured by causing a potential difference between the porous layer 3 and the main base layer 1a. The potential difference was caused by changing the voltage of the porous layer 3 to from −1.2 V to −0.7 V while the main base layer 1a was set to 0 V. FIG. 5 shows the results of measuring the current density.

FIG. 5 is a graph showing the results of a corrosion resistance test in Example 3. In FIG. 5, the "Untreated" indicates the aluminum raw material member 100 not irradiated with the laser beam. In addition, the graph shows the cases of irradiation with the laser beam with an intensity of either 110 MW/cm2, 220 MW/cm2, or 260 MW/cm2.

As show in FIG. 5, a difference in the current density change was found between the untreated case and the cases of irradiation with the laser beam 102. Specifically, the current density was made smaller by irradiation with the laser beam 102 at 110 MW/cm2 or higher than that of the untreated case. As the current density becomes smaller, the current is indicated to be less easy to flow. When the current hardly flows, corrosion caused by a weak current flow can be prevented. This can suppress occurrence of rust in the aluminum member 10, thereby capable of increasing environmental durability on the porous layer 3 (bonding surface).

Among the cases of irradiation with the laser beam 102, the case of irradiation with the laser beam 102 at 220 MW/cm2 or higher can further lower the current density. Thus, the current can be made further unlikely to flow. This result is because impurity elements in the aluminum raw material member 100 irradiated at 220 MW/cm2 or higher were made sufficiently harmless (oxidized), which seems to result in formation of the oxide layer 2 having increased insulation property. Hence, the irradiation with the laser beam 102 at 220 MW/cm2 or higher can sufficiently suppress occurrence of rust in the aluminum member 10, thereby capable of further enhancing environmental durability on the porous layer 3 (bonding surface).

Example 4

An environmental resistance test was conducted to evaluate how the environment affected the bonding surface.

Figure 6:
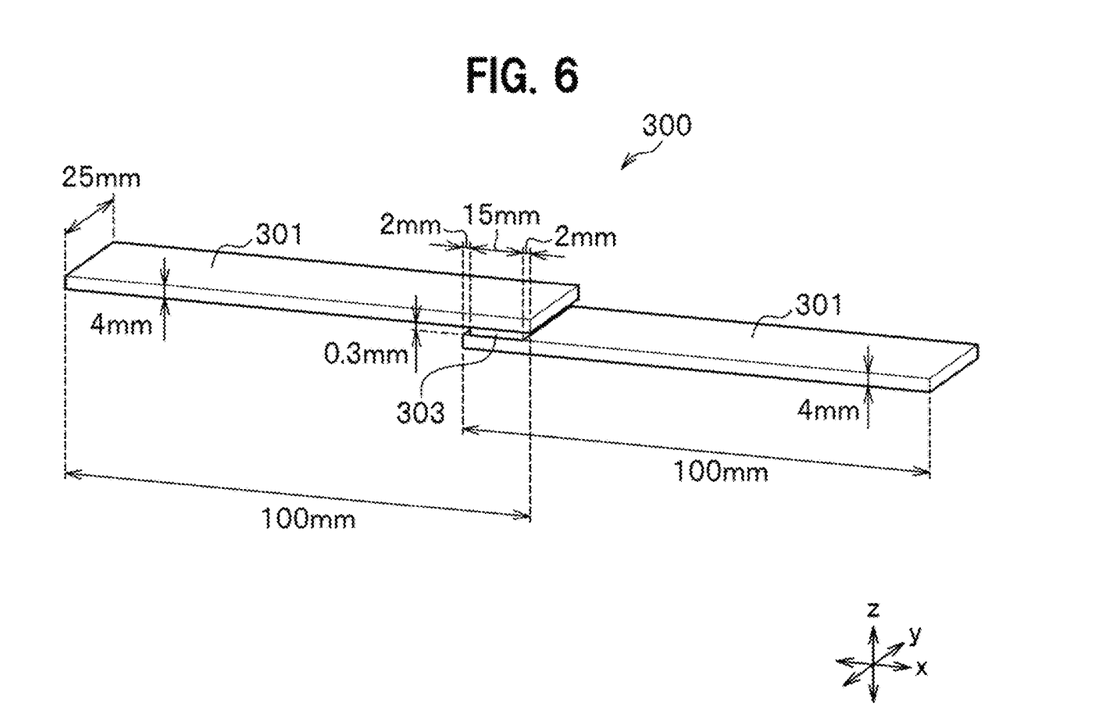
FIG. 6 is a perspective view of a test piece used in an environmental resistance test in Example 4.

FIG. 6 is a perspective view of a test piece 300 used in the environmental resistance test in Example 4. The test piece 300 was manufactured as follows. Two plate-shaped members 301 with a length (the length in the x-axis direction) of 100 mm, a width (the length in the y-axis direction) of 25 mm, and a thickness (the length in the z-axis direction) of 4 mm were provided. Each plate-shaped member 301 is made of the same material as of the aluminum raw material member 100 used in Example 1. A 19-mm region at an end portion of each plate-shaped member 301 was irradiated with the laser beam under the same conditions as in Example 1, except that the laser beam intensity was set to 220 MW/cm2. This caused formation of the porous layer 3 having metal particles 3*a* with a particle diameter of 10 nm on an upper surface of the end portion of the plate-shaped member 301.

Next, an adhesive was applied over the entire 15 mm-long widthwise region, where the porous layer 3 was formed, on one of the plate-shaped members 301 while the region was short from the edge by 2 mm. The epoxy-based adhesive of Example 1 disclosed in Japanese Patent No. 5086774 was used as the adhesive. Then, the region, where the porous layer 3 was formed, of the other plate-shaped member 301 was stacked and placed on the adhesive while the region is short from the edge by 2 mm. The resulting piece was held at 170° C. for 20 min to solidify the adhesive. In this way, the test piece 300 (Example), in which the two plate-shaped members 301 were fixed via an adhesive layer 303 with a thickness of 0.3 mm, was manufactured.

A test piece (Comparative Example) was manufactured in the same manner as for the test piece 300, except that sandblasting was carried out instead of the laser beam irradiation. The sandblasting was carried out in accordance with the protocol described in paragraph [0085] of JP-H11-173356A.

One of each of the test piece 300 or the test piece (Comparative Example) manufactured was subjected to the environmental resistance test. The environmental resistance test was performed in accordance with the saltwater spray test protocol (CCT) defined in JIS Z 2371:2015. Specifically, one cycle included neutral saltwater spraying and drying, and the cycle was repeated 120 times for each of the test piece 300 or the test piece (Comparative Example).

After the 120 cycles, a shear tensile test was conducted. The shear tensile test was conducted by aligning the long axis (x-axis) of the test piece 300 manufactured to the center line of the test piece 300 and by firmly fixing 40-mm portions of both ends of the test piece together with a support by using chucks of a material tester while a load is applied through the line. The tensile rate was set to 50 mm/min. In addition, the test piece 300 and the test piece (Comparative Example) that were not subjected to the environmental resistance test were likewise subjected to the shear tensile test. Then, a fracture surface thereof was inspected.

Figure 7:
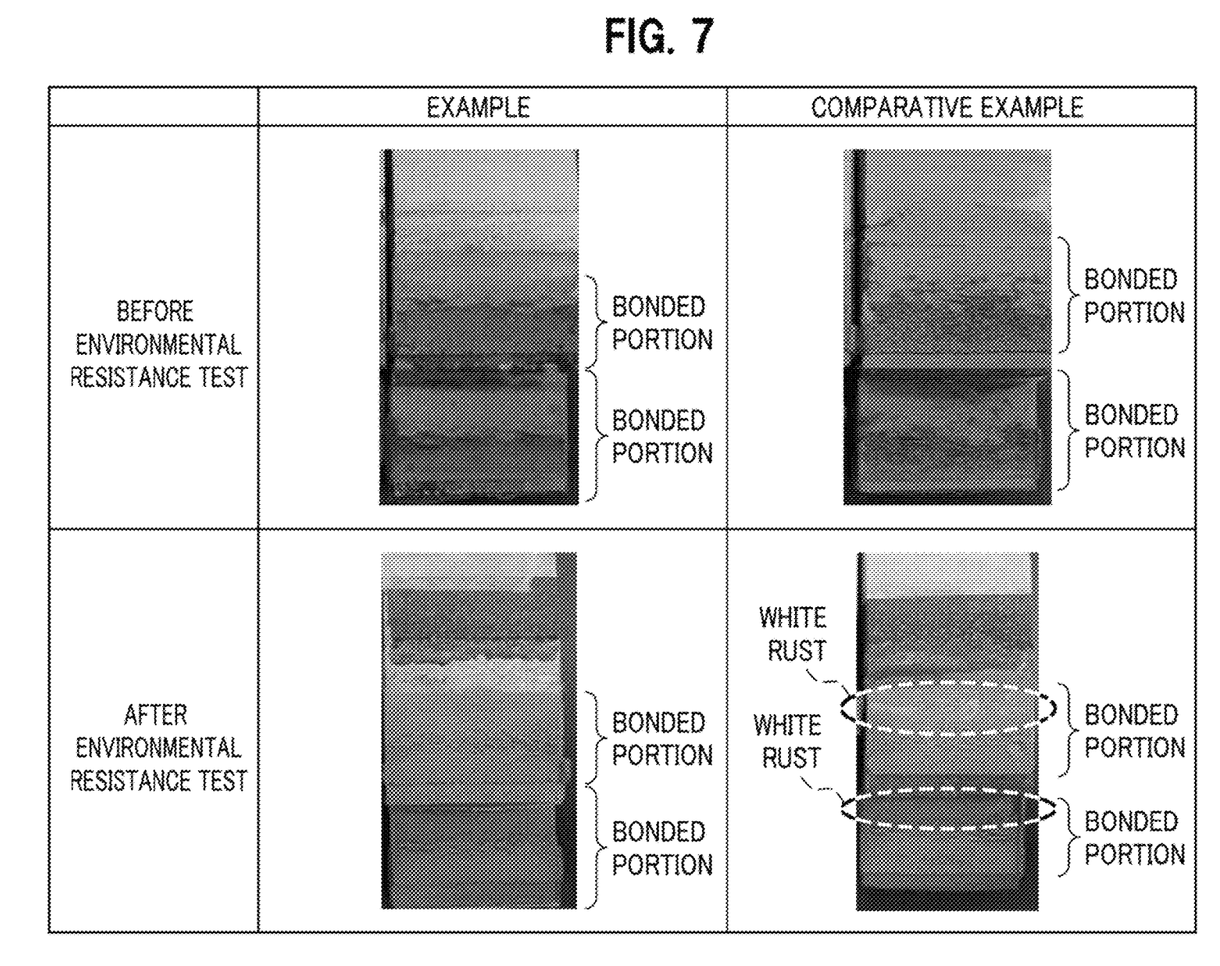
FIG. 7 is photographs of fracture surfaces before and after the environmental resistance test.

FIG. 7 is photographs of fracture surfaces before and after the environmental resistance test. The "BONDED PORTION" indicated in each photograph is a portion where the adhesive layer 303 was formed. In the Example, the bonded portion in any of that before or after the environmental resistance test looked the same. Hence, in the Example, no occurrence of corrosion caused by the environmental resistance test was found on the bonding surface between the adhesive layer 303 and the porous layer 3 even after the environmental resistance test. This may be because the adhesive layer 303 and the porous layer 3 were tightly attached and neutral saltwater did not infiltrate the interface therebetween. This result has demonstrated that in the Example, the tight adhesion on the bonding surface can be improved, thereby capable of increasing environmental resistance, namely environmental durability.

By contrast, in the Comparative Example, white rust, which is aluminum rust, occurred on a metal of a bonded portion (bonding surface), where the adhesive layer 303 was formed, after the environmental resistance test. This may be because there was a gap between the adhesive layer 303 and the sandblasted surface of the aluminum raw material member 100, and neutral saltwater then infiltrated this gap. Hence, in the Comparative Example, it has been found that there is room for improvement in environmental resistance on the bonding surface.

In addition, a test piece was manufactured in the same manner, except that the laser beam intensity was set to 110 MW/cm2. Then, the environmental resistance test was performed. The results have demonstrated that less white rust than in the case of the test piece (Comparative Example) occurred on the bonding surface. This may be because when the laser beam intensity was low, impurity elements in the aluminum raw material member 100 could not be made sufficiently harmless, and corrosion caused by the impurity elements occurred. Thus, when the aluminum raw material member 100 is an aluminum simple substance (pure aluminum), the laser beam intensity of 110 MW/cm2 or higher is sufficient. However, it has been found that when the aluminum raw material member 100 is aluminum alloy, it is preferable to set the laser beam intensity to 220 MW/cm2 or higher so as to make impurity elements sufficiently harmless.

Although the disclosure has been described above by reference to certain embodiments of the disclosure, the disclosure is not limited to the embodiments described above. Modifications and variations of the embodiments described above will occur to those skilled in the art, in light of the above teachings. The scope of the disclosure is defined with reference to the following claims.

What is claimed is:

1. A process for producing an aluminum member, comprising:
    irradiating a surface of an aluminum raw material member comprising, as a component, aluminum or aluminum alloy and unavoidable impurities with a top-hat laser beam at an intensity of from 110 M/Wcm$^2$ to 320 MW/cm$^2$, wherein
    the aluminum member comprises: in sequence,
        a base layer comprising, as a component, aluminum or aluminum alloy and having unavoidable impurities;
        an oxide layer comprising an aluminum oxide; and a porous layer comprising a porous aggregate of aluminum metal particles,
the porous layer comprises the aluminum metal particles with a diameter of from 6 nm to 20 nm, and
the base layer further comprises:
  a main base layer further comprising impurity elements; and
  a heteroelement layer that is disposed on the porous layer side and further comprises a higher concentration of the impurity elements than the main base layer.

2. The process of claim 1, wherein the intensity of the top-hat laser beam is 220 MW/cm$^2$ to 320 MW/cm$^2$.

3. The process of claim 1, wherein the irradiation with the top-hat laser beam is carried out under an atmosphere at from 45% RH to 90% RH.

4. The process of claim 1, wherein the irradiation with the top-hat laser beam is carried out under an oxidizing atmosphere.

5. The process of claim 1, wherein the aluminum raw material member comprises aluminum alloy.

6. An aluminum member comprising: in sequence,
a base layer comprising, as a component, aluminum or aluminum alloy and having unavoidable impurities;
an oxide layer comprising an aluminum oxide; and
a porous layer comprising a porous aggregate of aluminum metal particles, wherein
the porous layer comprises the aluminum metal particles with a diameter of from 6 nm to 20 nm, and
the base layer further comprises:
  a main base layer further comprising impurity elements; and
  a heteroelement layer that is disposed on the porous layer side and further comprises a higher concentration of the impurity elements than the main base layer.

7. The aluminum member of claim 6, wherein in the porous layer, the aluminum metal particles are deposited in a height direction.

8. The aluminum member of claim 7, wherein the porous layer has a pit-like structure in which pits are formed, in the height direction, between adjacent deposits among the deposits of the aluminum metal particles.

9. The aluminum member of claim 8, wherein an interval between the adjacent deposits is from 1 nm to 50 nm.

10. The aluminum member of claim 6, wherein the oxide layer has a thickness of from 20 nm to 30 nm.

11. The aluminum member of claim 6, wherein the aluminum member comprises:
an adhesive layer bonded to the porous layer; and
a member to be bonded, the member being bonded to the adhesive layer.

12. The aluminum member of claim 11, wherein the member to be bonded comprises a carbon fiber-reinforced composite member or a second aluminum member.

* * * * *